(12) United States Patent
Kim et al.

(10) Patent No.: US 9,488,771 B2
(45) Date of Patent: Nov. 8, 2016

(54) LIGHTING MODULE

(75) Inventors: Young Sik Kim, Seoul (KR); Jun Chul Hyun, Seoul (KR); Sang Jun Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 44 days.

(21) Appl. No.: 14/241,549

(22) PCT Filed: Aug. 29, 2012

(86) PCT No.: PCT/KR2012/006902
§ 371 (c)(1),
(2), (4) Date: Feb. 27, 2014

(87) PCT Pub. No.: WO2013/032226
PCT Pub. Date: Mar. 7, 2013

(65) Prior Publication Data
US 2014/0218965 A1 Aug. 7, 2014

(30) Foreign Application Priority Data
Aug. 31, 2011 (KR) ........................ 10-2011-0087672

(51) Int. Cl.
| | | |
|---|---|---|
| *F21V 8/00* | (2006.01) | |
| *H05B 33/08* | (2006.01) | |
| *F21W 131/10* | (2006.01) | |
| *F21W 131/40* | (2006.01) | |
| *F21Y 103/00* | (2016.01) | |

(Continued)

(52) U.S. Cl.
CPC ........... *G02B 6/0075* (2013.01); *G02B 6/0003* (2013.01); *G02B 6/0051* (2013.01); *G02B 6/0053* (2013.01); *G02B 6/0055* (2013.01); *G02B 6/0076* (2013.01); *H05B 33/0803* (2013.01); *F21W 2131/10* (2013.01); *F21W 2131/40* (2013.01); *F21Y 2101/02* (2013.01); *F21Y 2103/003* (2013.01); *F21Y 2113/005* (2013.01)

(58) Field of Classification Search
CPC ........................... G02B 6/0076; G02B 6/0075
See application file for complete search history.

(56) References Cited

U.S. PATENT DOCUMENTS

| | | | |
|---|---|---|---|
| 2003/0063456 A1 | 4/2003 | Katahira | |
| 2004/0004827 A1* | 1/2004 | Guest | ............................. 362/31 |

(Continued)

FOREIGN PATENT DOCUMENTS

| | | |
|---|---|---|
| CN | 1664670 A | 9/2005 |
| CN | 101059620 A | 10/2007 |

(Continued)

OTHER PUBLICATIONS

European Search Report issued in Application No. 12827772.0 dated Feb. 20, 2015.

(Continued)

*Primary Examiner* — Eric T Eide
(74) *Attorney, Agent, or Firm* — KED & Associates, LLP

(57) ABSTRACT

A lighting module may be provided that includes: a first light guide plate which includes a top surface and a bottom surface, each of which emits light, and a light incident side; a second light guide plate which is disposed below the first light guide plate and includes a top surface and a bottom surface, each of which emits light, and a light incident side; a reflector which is disposed between the first light guide plate and the second light guide plate; and a light source which includes first light emitting devices disposed on a side of the first light guide plate, and second light emitting devices disposed on a side of the second light guide plate.

19 Claims, 2 Drawing Sheets

(51) Int. Cl.
*F21Y 101/02* (2006.01)
*F21Y 113/00* (2016.01)

(56) References Cited

U.S. PATENT DOCUMENTS

| | | |
|---|---|---|
| 2005/0185390 A1 | 8/2005 | Shimura |
| 2006/0066783 A1* | 3/2006 | Sampsell ............. G02B 26/001 349/114 |
| 2007/0247872 A1 | 10/2007 | Lee et al. |
| 2008/0285274 A1* | 11/2008 | Jung ............................. 362/240 |
| 2010/0157197 A1* | 6/2010 | Lee et al. ........................ 349/62 |
| 2011/0001901 A1* | 1/2011 | Solomon et al. ............... 349/65 |
| 2011/0051045 A1* | 3/2011 | Hur ........................ G02B 6/008 349/65 |
| 2011/0090426 A1* | 4/2011 | Choi ...................... G02B 6/009 349/65 |
| 2011/0163940 A1 | 7/2011 | Lee et al. |
| 2011/0205727 A1* | 8/2011 | Kim et al. ....................... 362/84 |
| 2011/0227895 A1* | 9/2011 | Takahashi et al. ........... 345/211 |

FOREIGN PATENT DOCUMENTS

| | | |
|---|---|---|
| CN | 201302097 Y | 9/2009 |
| CN | 201396623 Y | 2/2010 |
| CN | 201680201 U | 12/2010 |
| CN | 102162602 A | 8/2011 |
| JP | H10-269822 A | 10/1998 |
| JP | 2004-014280 A | 1/2004 |
| JP | 2011-028018 A | 2/2011 |
| JP | 2011-113870 A | 6/2011 |
| KR | 10-2006-0124372 A | 12/2006 |
| KR | 10-2008-0095738 A | 10/2008 |

OTHER PUBLICATIONS

Chinese Office Action issued in Application No. 201280042221.4 dated Feb. 27, 2015 (English Text Only).
International Search Report dated Feb. 27, 2013 issued in Application No. PCT/KR2012/006902.

* cited by examiner

LIGHTING MODULE

CROSS-REFERENCE TO RELATED PATENT APPLICATIONS

This application is a U.S. National Stage Application under 35 U.S.C. §371 of PCT Application No. PCT/KR2012/006902, filed Aug. 29, 2012, which claims priority to Korean Patent Application No. 10-2011-0087672, filed Aug. 31, 2011, whose entire disclosures are hereby incorporated by reference.

TECHNICAL FIELD

Embodiments relate to a lighting module.

BACKGROUND ART

In general, an electric bulb or a fluorescent lamp is commonly used as an indoor or outdoor lighting lamp. However, the electric bulb or the fluorescent lamp has a short life span, so that it should be frequently changed. Moreover, a conventional fluorescent lamp is degraded due to elapse of time for its use. As a result, it is often that its illuminance is gradually decreased.

In order to overcome such problems, a lighting apparatus is now being developed by using a light emitting device (hereinafter, referred to as LED). The LED is easy to control and has a rapid response speed, high electro-optic conversion efficiency, a long life span, low power consumption and high luminance. The LED is also used to create emotional lighting.

DISCLOSURE OF INVENTION

Technical Problem

The objective of the present invention is to provide a lighting module which emits light upward and downward at the same time or emits light in any one direction of upward and downward directions.

The objective of the present invention is to provide a lighting module which is able to control the amount of light emitted upward and the amount of light emitted downward.

The objective of the present invention is to provide a lighting module which is able to remove hot spot.

Solution to Problem

One embodiment is a lighting module. The lighting module includes: a first light guide plate which includes a top surface and a bottom surface, each of which emits light, and a light incident side; a second light guide plate which is disposed below the first light guide plate and includes a top surface and a bottom surface, each of which emits light, and a light incident side; a reflector which is disposed between the first light guide plate and the second light guide plate; and a light source which includes first light emitting devices disposed on a side of the first light guide plate, and second light emitting devices disposed on a side of the second light guide plate.

The light source includes a substrate on which the first light emitting devices and the second light emitting devices are disposed.

The first light emitting devices are disposed adjacent to each other on the substrate. The second light emitting devices are disposed adjacent to each other on the substrate.

The lighting module includes an optical plate which is disposed between the side of the first light guide plate and the first light emitting devices and includes a fluorescent substance.

The optical plate is a prism sheet.

The lighting module further includes a case in which the sides of the first and the second light guide plates are disposed and in which the light source is disposed.

The case includes: a first case on which one sides of the first and the second light guide plates are disposed; and a second case on which the other sides of the first and the second light guide plates are disposed. A distance on the top surface of the first light guide plate between the first case and the second case is different from a distance on the bottom surface of the second light guide plate between the first case and the second case.

The case includes an upper case and a lower case. The upper case and the lower case include a base and an extension part respectively. A length of the extension part of the upper case is different from a length of the extension part of the lower case.

At least one of the top surface of the first light guide plate and the bottom surface of the second light guide plate includes a protrusion. The case includes a receiving recess which is coupled to the protrusion.

The lighting module further includes a cover disposed on any one of the top surface of the first light guide plate and the bottom surface of the second light guide plate.

The cover blocks all or a part of the light emitted from the top surface of the first light guide plate or the bottom surface of the second light guide plate.

The cover is attached to the top surface of the first light guide plate or the bottom surface of the second light guide plate.

The bottom surface of the first light guide plate includes a first pattern. The top surface of the second light guide plate includes a second pattern.

The shape or a size of the first pattern is different from the shape or a size of the second pattern.

The interval between the first patterns is different from the interval between the second patterns.

The first pattern and the second pattern include a lens shape.

The bottom surface of the second light guide plate includes a projection.

Another embodiment is a lighting module. The lighting module includes: a light guide plate which includes a top surface and a bottom surface, each of which emits light, and a light incident side; a light source which includes light emitting devices disposed on the side of the light guide plate and a substrate on which the light emitting devices are disposed; and a case in which the light source is disposed and which covers the side of the light guide plate. At least one of the top and bottom surfaces of the light guide plate includes a protrusion. The case includes a receiving recess which is coupled to the protrusion.

Further another embodiment is a lighting module. The lighting module includes: a light guide plate which includes a first side, a second side, a top surface and a bottom surface; a first light source which includes first light emitting devices disposed on the first side of the light guide plate and a first substrate on which the first light emitting devices are disposed; a second light source which includes second light emitting devices disposed on the second side of the light guide plate and a second substrate on which the second light emitting devices are disposed; a first case in which the first light source is disposed and which is coupled to the first side of the light guide plate; and a second case in which the second light source is disposed and which is coupled to the second side of the light guide plate. A light emitting area of the top surface of the light guide plate is different from a light emitting area of the bottom surface of the light guide plate.

At least one of the top and bottom surfaces of the light guide plate includes a protrusion disposed therein. The first and the second cases include a receiving recess which is coupled to the protrusion.

Advantageous Effects of Invention

A lighting module according to the embodiment is able to emit light upward and downward at the same time or emit light in any one direction of upward and downward directions.

A lighting module according to the embodiment is able to control the amount of light emitted upward and the amount of light emitted downward.

A lighting module according to the embodiment is able to remove hot spot.

MODE FOR THE INVENTION

A thickness or size of each layer is magnified, omitted or schematically shown for the purpose of convenience and clearness of description. The size of each component does not necessarily mean its actual size.

In description of embodiments of the present invention, when it is mentioned that a substrate is formed "on" or "under" another substrate, it means that the mention includes a case where two same substrates are formed directly contacting with each other or are formed such that at least one separate substrate is interposed between the two same substrates. The "on" and "under" will be described to include the upward and downward directions based on one substrate.

Hereafter, a lighting module according to an embodiment will be described with reference to the accompanying drawings.

Figure 1:
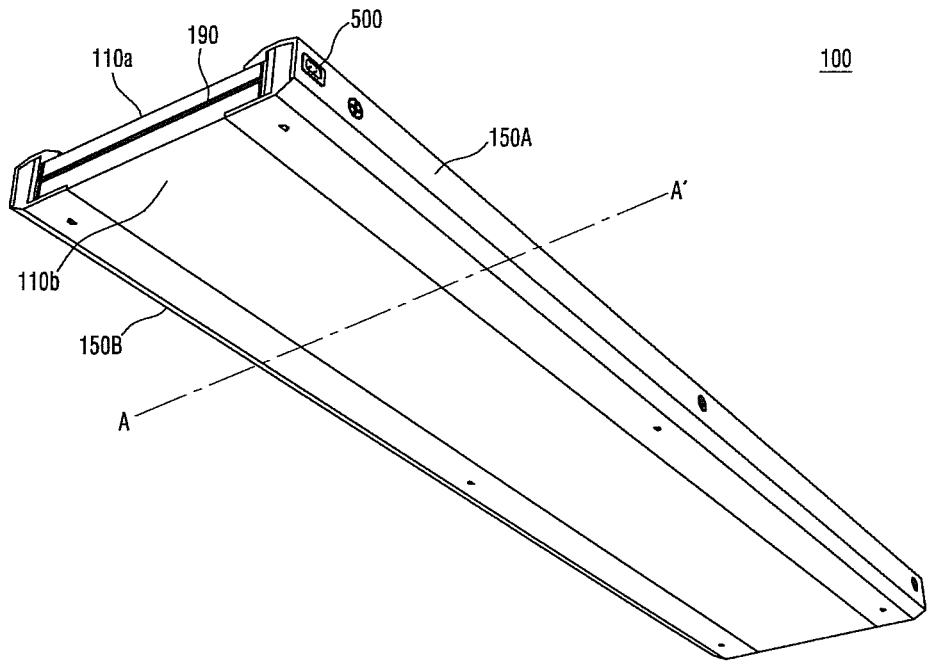
FIG. 1 is a perspective view of a lighting module according to an embodiment.
Figure 2:
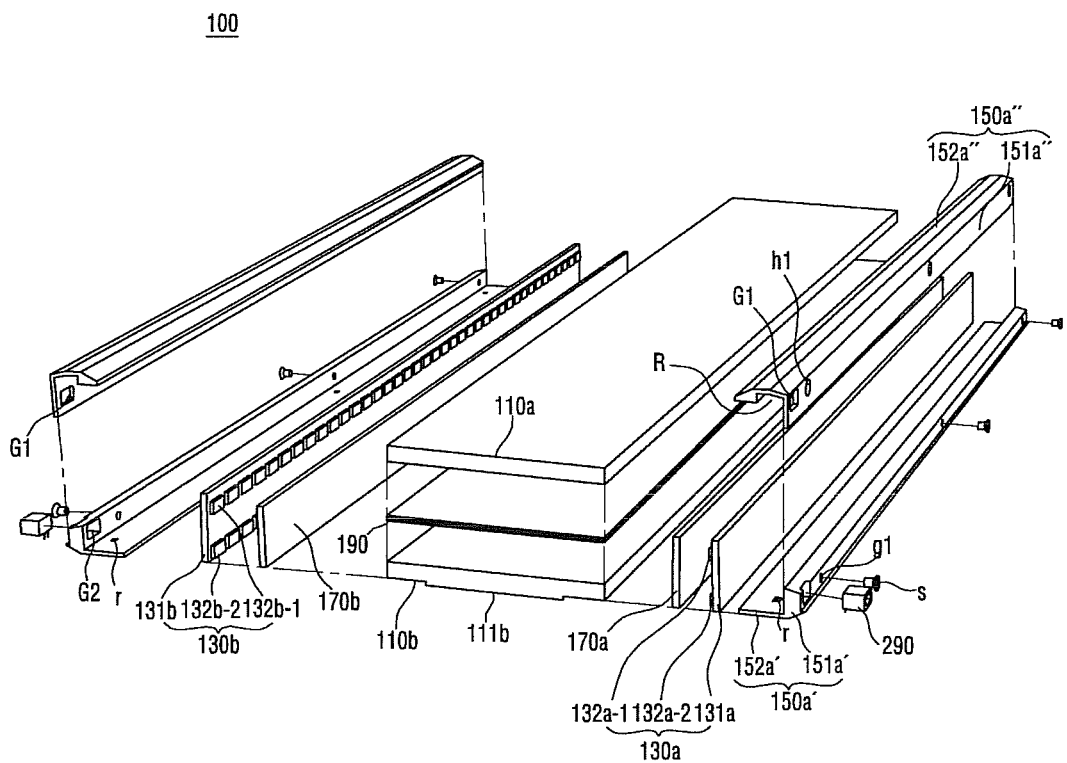
FIG. 2 is an exploded perspective view of the lighting module shown in FIG. 1.
Figure 3:
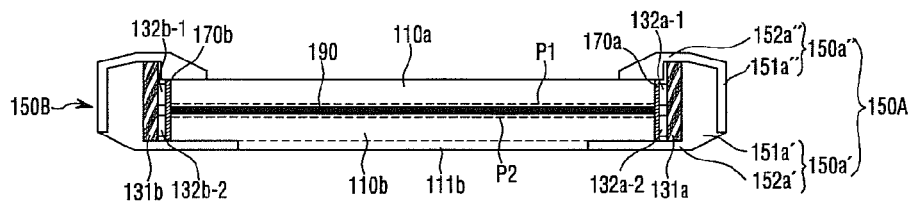
FIG. 3 is a cross sectional view of the lighting module shown in FIG. 1.

FIG. 1 is a perspective view of a lighting module according to an embodiment. FIG. 2 is an exploded perspective view of the lighting module shown in FIG. 1. FIG. 3 is a cross sectional view taken along line A-A' of the lighting module shown in FIG. 1.

Referring to FIGS. 1 to 3, a lighting module 100 may include a first light guide plate 110a, a second light guide plate 110b, a first light source 130a, a second light source 130b, a first case 150A, a second case 150B, a first optical plate 170a, a second optical plate 170b and a reflector 190.

For convenience of description, the first and the second cases 150A and 150B will be described first.

The first case 150A receives the first light source 130a and receives one sides of the first and the second light guide plates 110a and 110b. The second case 150B receives the second light source 130b and receives the other sides of the first and the second light guide plates 110a and 110b. Since the second case 150B is the same as the first case 150A, a description of the second case 150B will be replaced by the description of the first case 150A.

The first case 150A may include a lower case 150a' and an upper case 150a". The lower case 150a' and the upper case 150a" may be coupled to each other by a plurality of screws "S".

The lower case 150a' includes a base 151a' and an extension part 152a'. The first light source 130a may be disposed on the inner surface of the base 151a'. The extension part 152a' extends perpendicular to the inner surface of the base 151a'. One sides of the first light source 130a and the second light guide plate 110b may be disposed on the inner surface of the extension part 152a'. The extension part 152a' may be connected to a projection 111b of the second light guide plate 110b. Specifically, the outermost portion of the extension part 152a' may come in contact with the side of the projection 111b.

The upper case 150a" includes a base 151a" and an extension part 152a". The base 151a' of the lower case 150a' may be disposed on the inner surface of the base 151a". The extension part 152a" extends perpendicular to the inner surface of the base 151a". The base 151a' of the lower case 150a' and one sides of the first light source 130a and the first light guide plate 110a may be disposed on the inner surface of the extension part 152a".

A relation between the first case 150A and the second case 150B will be described with reference to FIG. 4.

Figure 4:
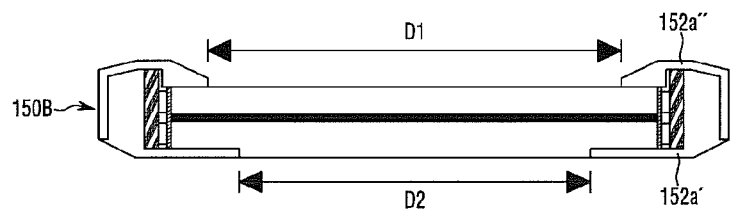
FIG. 4 is a cross sectional view of the lighting module shown in FIG. 1.

FIG. 4 is a cross sectional view of the lighting module shown in FIG. 1.

Referring to FIGS. 1 to 4, in the first case 150A and the second case 150B, the extension part 152a' of the lower case 150a' is longer than the extension part 152a" of the upper case 150a". Here, one sides of the first light guide plate 110a and the second light guide plate 110b may be used as a basis for comparing the lengths of the two extension parts 152a' and 152a". In other words, on the basis of the one sides of the first light guide plate 110a and the second light guide plate 110b, the extension part 152a' of the lower case 150a' is longer than the extension part 152a" of the upper case 150a". Accordingly, a distance D1 on the top surface of the first light guide plate 110a between the first case 150A and the second case 150B is longer than a distance D2 on the bottom surface of the second light guide plate 110b between the first case 150A and the second case 150B. Therefore, the lighting module according to the embodiment is able to control the amount of light emitted upward and the amount of light emitted downward. Also, the lighting module according to the embodiment is able to remove hot spot.

The first light guide plate 110a and the second light guide plate 110b are more covered by the extension part 152a' of the lower case 150a' than by the extension part 152a" of the upper case 150a". Specifically, the covered area of the second light guide plate 110b by the extension part 152a' of the lower case 150a' is less than the covered area of the first light guide plate 110a by the extension part 152a" of the upper case 150a". Accordingly, the covered area of the first light guide plate 110a by the first case 150A is different from the covered area of the second light guide plate 110b by the first case 150A. Also, the covered area of the first light guide plate 110a by the second case 150B is different from the covered area of the second light guide plate 110b by the second case 150B. Therefore, the lighting module according to the embodiment is able to control the amount of light emitted upward and the amount of light emitted downward. The lighting module according to the embodiment is also able to remove hot spot. Here, the cross sectional area of the extension part 152a" of the upper case 150a" may be less than that of the extension part 152a' of the lower case 150a'.

Referring to FIGS. 1 to 3, the base 151a' of the lower case 150a' may have a coupling recess (or coupling hole) "g1". The base 151a" of the upper case 150a" may have a coupling hole "h1". The coupling hole "h1" and the coupling recess "g1" are disposed corresponding to each other. When the lower case 150a' is coupled to the upper case 150a", the screw "S" passes through the coupling hole "h1" and is inserted into the coupling recess "g1". Therefore, the base 151a' of the lower case 150a' may be coupled close to the base 151a" of the upper case 150a". Here, the base 151a' of the lower case 150a' has the coupling recess "g1" instead of the coupling hole in order that the first light source 130a is prevented from being damaged or broken by the screw "S" and from being electrically contacted with the screw "S".

The base 151a' of the lower case 150a' may have an opening "G2". The base 151a" of the upper case 150a" may have an opening "G1". The opening "G2" of the lower case 150a' and the opening "G1" of the upper case 150a" may be disposed corresponding to each other. Specifically, the opening "G2" of the lower case 150a' and the opening "G1" of the upper case 150a" may be disposed on one side of the first case 150A. A driving driver 290 may be disposed in the opening "G2" of the lower case 150a' and in the opening "G1" of the upper case 150a". The driving driver 290 is electrically connected to the first light source 130a. The driving driver 290 supplies external electric power to the first light source 130a or controls the on/off of the first light source 130a.

Though not shown in the drawings, the extension part 152a' of the lower case 150a' may have a recess into which one side of a substrate 131a of the first light source 130a is inserted. The extension part 152a" of the upper case 150a" may have a recess into which the other side of the substrate 131a of the first light source 130a is inserted. The recesses may be formed extending in one direction. Therefore, the first light source 130a can be stably disposed in the first case 150A.

The extension part 152a' of the lower case 150a' may have a receiving recess "r". The second light guide plate 110b may be coupled to the receiving recess "r". This will be described with reference to FIG. 5.

Figure 5:
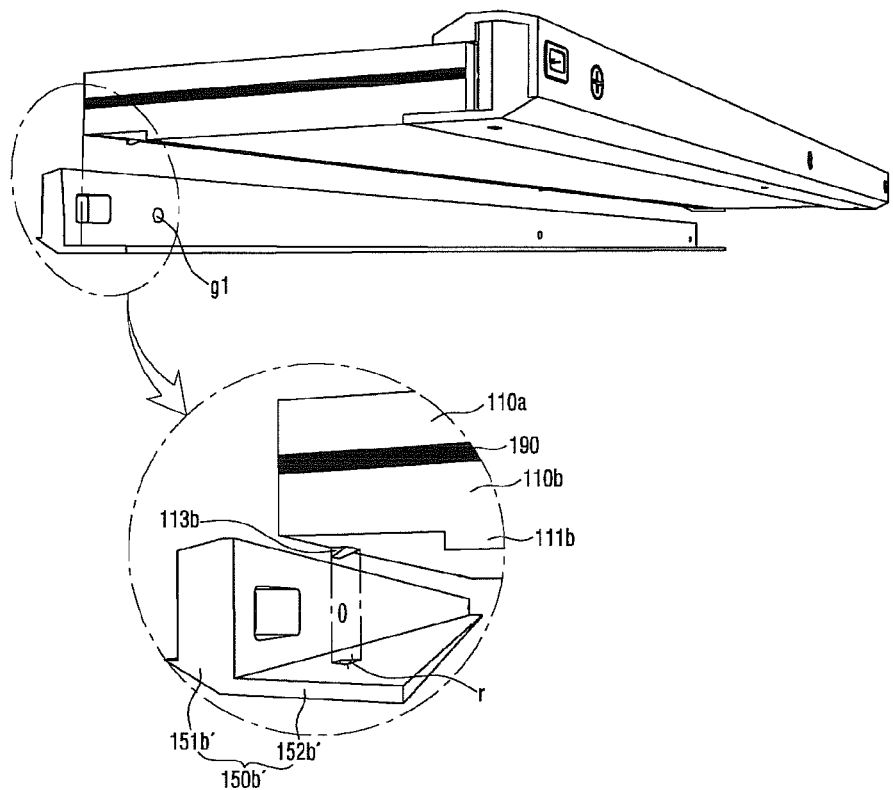
FIG. 5 is a view for describing that a second light guide plate and a second case which are shown in FIG. 2 are coupled to each other.

FIG. 5 is a view for describing that the light guide plate 110b and second case 150B which are shown in FIG. 2 are coupled to each other. The first case 150A may be also coupled to the second light guide plate 110b.

Specifically, referring to FIG. 5, the second light guide plate 110b may have a protrusion 113b. The protrusion 113b may protrude outwardly from the bottom surface of the second light guide plate 110b. The protrusion 113b may be connected to the second light guide plate 110b or may be integrally formed with the second light guide plate 110b. The inner surface of the extension part 152b' of the lower case 150b' may have the receiving recess "r". The protrusion 113b of the second light guide plate 110b may be inserted into the receiving recess "r". When the second light guide plate 110b is coupled to the lower case 150b', the protrusion 113b is inserted into the receiving recess "r". Therefore, a coupling force between the second light guide plate 110b and the extension part 152b' of the lower case 150b' is enhanced and the second light guide plate 110b can be prevented from moving or separating.

Meanwhile, though not shown in the drawings, it is obvious that the first light guide plate 110a may have the protrusion and the upper case 150" may have the receiving recess. Even when the first and the second light guide plates 110a and 110b are integrally formed, the protrusion and the receiving recess may be formed.

Referring back to FIGS. 1 to 3, the base 151a' and extension part 152a' of the lower case 150a' may be independently formed respectively. Both of them are coupled to each other to form the lower case 150a'. Also, the base 151a" and extension part 152a" of the upper case 150a" may be independently formed respectively. Both of them are coupled to each other to form the upper case 150a".

When the first light source 130a is disposed on the inner surface of the base 151a" of the upper case 150a", the extension part 152a' of the lower case 150a' and the extension part 152a" of the upper case 150a" are able to support the first light source 130a, in particular, both sides of the substrate 131a.

The upper case 150a" may have a receiving portion "R". The receiving portion "R" may receive one side of the first light source 130a and one side of the base 151a' of the lower case 150a'.

The first light source 130a is received in the first case 150A. Specifically, the first light source 130a may be disposed on the inner surface of the base 151a' of the lower case 150a' of the first case 150A. Also, the first light source 130a may be supported by being disposed between the extension part 152a' of the lower case 150a' and the extension part 152a" of the upper case 150a".

The first light source 130a and the second light source 130b are arranged opposite to each other. The first light guide plate 110a and the second light guide plate 110b are disposed between the first light source 130a and the second light source 130b. That is, the first light source 130a may be disposed on one sides of the first light guide plate 110a and the second light guide plate 110b. The second light source 130b may be disposed on the other sides of the first light guide plate 110a and the second light guide plate 110b. The first light source 130a will be described in detail.

The first light source 130a may include the substrate 131a, a first light emitting device 132a-1 and a second light emitting device 132a-2.

The substrate 131a has a rectangular parallelepiped plate shape. The substrate 131a may include a top surface, a bottom surface and four sides. The substrate 131a may be also formed to have various shapes.

The first light emitting devices 132a-1 and the second light emitting devices 132a-2 may be arranged in a row on the top surface of the substrate 131a.

The bottom surface of the substrate 131a may be disposed on the inner surface of the base 151a' of the lower case 150a' of the first case 150A.

The substrate 131a may be any one of a printed circuit board (PCB), a metal PCB (MPCB), a metal core PCB (MCPCB), a flexible PCB (FPCB), a ceramic PCB.

A plurality of the first light emitting devices 132a-1 and a plurality of the second light emitting devices 132a-2 are disposed on the top surface of the substrate 131a. The plurality of the first light emitting devices 132a-1 may be arranged in a row. The plurality of the second light emitting devices 132a-2 may be also arranged in a row.

The first light emitting devices 132a-1 may be disposed on one side of the first light guide plate 110a. The second light emitting devices 132a-2 may be disposed on one side of the second light guide plate 110b. Therefore, the first light emitting devices 132a-1 may emit light to the first light guide plate 110a. The second light emitting devices 132a-2 may emit light to the second light guide plate 110b.

The amount of the light emitted from the first light emitting devices 132a-1 may be different from that of the light emitted from the second light emitting devices 132a-2. Through this, the amount of the light emitted from the first light guide plate 110a may be different from that of the light emitted from the second light guide plate 110b.

The first light emitting device 132a-1 and the second light emitting device 132a-2 may emit the same colored light or may emit differently colored lights. Therefore, light having various colors can be created through a combination of the two different colors, thereby creating emotional lighting.

The first light emitting device 132a-1 and the second light emitting device 132a-2 may be a blue light emitting diode or may be a white light emitting diode having a high color rendering index (CRI). The white light emitting diode may be formed by molding synthetic resins including a fluorescent substance on a blue light emitting chip. Here, though natural light (white light) can be created by allowing the synthetic resin to include a yellow fluorescent substance, the synthetic resin may further include a green fluorescent substance or a red fluorescent substance in order to improve a color rendering index and to reduce a color temperature.

The yellow fluorescent substance emits yellow light having a dominant wavelength of from 540 nm to 585 nm in response to blue light (430 nm to 480 nm) from a blue diode chip. The green fluorescent substance emits green light having a dominant wavelength of from 510 nm to 535 nm in response to the blue light (430 nm to 480 nm). The red fluorescent substance emits red light having a dominant wavelength of from 600 nm to 650 nm in response to the blue light (430 nm to 480 nm). The yellow fluorescent substance may be a silicate fluorescent substance, a YAG of a garnet fluorescent substance and an oxynitride fluorescent substance. The yellow fluorescent substance may be selected from $Y_3Al_5O_{12}:Ce^{3+}$(Ce:YAG), $CaAlSiN_3:Ce^{3+}$ and $Eu^{2+}$—SiAlON fluorescent substance and/or may be selected from BOSE fluorescent substance. The yellow fluorescent substance may be doped at an arbitrary appropriate level so as to provide light output of a desired wavelength. Ce and/or Eu may be doped in the fluorescent substance at a dopant concentration of about 0.1% to about 20%. A fluorescent substance appropriate for this purpose may include products produced by Mitsubishi Chemical Company (Tokyo, Japan), LeuchtstoffwerkBreitungenGmbH (Breitungen, Germany) and Intermatix Company (Fremont, Calif.). The green fluorescent substance may be a silicate fluorescent substance, a nitride fluorescent substance and an oxynitride fluorescent substance. The red fluorescent substance may be a nitride fluorescent substance and a sulfide fluorescent substance. The red fluorescent substance may include $CaAlSiN_3:Eu^{2+}$ and $Sr_2Si_5N_8:Eu^{2+}$. These fluorescent substances are able to cause a quantum efficiency to be maintained greater than 80% at a temperature higher than 150° C. Another usable red fluorescent substance may be selected from not only $CaSiN_2:Ce^{3+}$ and $CaSiN_2:Eu^{2+}$ but $Eu^{2+}$—SiAlON fluorescent substance and/or may be selected from $(Ca,Si,Ba)SiO_4:Eu^{2+}$ (BOSE)fluorescent substance. Particularly, a CaAlSiN:$Eu^{2+}$ fluorescent substance of the Mitsubishi Chemical Company may have a dominant wavelength of about 624 nm, a peak wavelength of about 628 nm and FWHM of about 100 nm.

When the synthetic resin is mixed with many kinds of fluorescent substances, an addition ratio of the color of the fluorescent substance may be formed such that the green fluorescent substance is more used than the red fluorescent substance, and the yellow fluorescent substance is more used than the green fluorescent substance. The garnet material, the silicate material and the oxynitride material may be used as the yellow fluorescent substance. The silicate material and the oxynitride material may be used as the green fluorescent substance. The nitride material may be used as the red fluorescent substance. The synthetic resin may be mixed with various kinds of the fluorescent substances or may be configured by a layer including the red fluorescent substance, a layer including the green fluorescent substance and a layer including the yellow fluorescent substance, which are formed separately from each other.

The second light source 130b may include a substrate 131b and a first light emitting device 132b-1 and a second light emitting device 132b-2. Since the substrate 131b, the first light emitting device 132b-1 and the second light emitting device 132b-2 of the second light source 130b are the same as the substrate 131a, the first light emitting device 132a-1 and the second light emitting device 132a-2 of the first light source 130a, detailed description thereof will be replaced by the foregoing description.

The first light emitting device 132a-1 and the second light emitting device 132a-2 of the first light source 130a may have a color temperature different from that of the first light emitting device 132b-1 and the second light emitting device 132b-2 of the second light source 130b. For example, the first light emitting device 132a-1 and the second light emitting device 132a-2 of the first light source 130a may be a warm white LED, and the second light emitting device 132b-2 of the second light source 130b may be a cool white LED. The warm white LED and the cool white LED emit white light. Since the warm white LED and the cool white LED are able to emit mixed white light by emitting a correlated color temperature respectively, a color rendering index (CRI) representing how close light is to natural sunlight becomes larger. Accordingly, it is possible to prevent an actual color of an object from being distorted and to reduce fatigue of the eyes of a user.

The amount of the light emitted from the first light emitting device 132a-1 of the first light source 130a may be different from the amount of the light emitted from the first light emitting device 132b-1 of the second light source 130b. Accordingly, the light emitted from the first light guide plate 110a may be distributed to lean in a particular direction.

The amount of the light emitted from the second light emitting device 132a-2 of the first light source 130a may be different from the amount of the light emitted from the second light emitting device 132b-2 of the second light source 130b. Accordingly, the light emitted from the second light guide plate 110b may be distributed to lean in a particular direction.

The light guide plates 110a and 110b may include the first light guide plate 110a and the second light guide plate 110b. The first light guide plate 110a and the second light guide plate 110b may be disposed between the first light source 130a and the second light source 130b.

The first light guide plate 110a and the second light guide plate 110b have both sides respectively. One sides of the first light guide plate 110a and the second light guide plate 110b may be received in the first case 150A. The other sides of the first light guide plate 110a and the second light guide plate 110b may be received in the second case 150B.

The first light guide plate 110a and the second light guide plate 110b may have a rectangular parallelepiped plate shape. Therefore, each of the first light guide plate 110a and the second light guide plate 110b may include a top surface, a bottom surface and four sides.

The first light guide plate 110a and the second light guide plate 110b may be disposed such that the bottom surface of the first light guide plate 110a and the top surface of the second light guide plate 110b face each other.

The first light source 130a is disposed on one sides of the first light guide plate 110a and the second light guide plate 110b. The second light source 130b is disposed on the other sides facing the one sides of the first light guide plate 110a and the second light guide plate 110b.

The first light emitting devices 132a-1 of the first light source 130a may be disposed on the one side of the first light guide plate 110a. The first light emitting devices 132b-1 of the second light source 130b may be disposed on the other side of the first light guide plate 110a.

The second light emitting devices 132a-2 of the first light source 130a may be disposed on the one side of the second light guide plate 110b. The second light emitting devices 132b-2 of the second light source 130b may be disposed on the other side of the second light guide plate 110b.

The first light guide plate 110a receives light from the first light source 130a and the second light source 130b through both sides thereof and emits the light through the top and bottom surfaces thereof. The second light guide plate 110b receives light from the first light source 130a and the second light source 130b through both sides thereof and emits the light through the top and bottom surfaces thereof. In other words, the first light guide plate 110a and the second light guide plate 110b guide light and change the path of the light.

The first light guide plate 110a and the second light guide plate 110b may be formed of acrylic resin like polymethylmetaacrylate (PMMA), polyethylene terephthlate (PET) resin, poly carbonate (PC) resin, cycloolefin copolymer (COC) resin and polyethylene naphthalate (PEN) resin and the like in consideration of thermal expansion based on a temperature in use.

The first light guide plate 110a and the second light guide plate 110b may have a predetermined pattern. Specifically, the bottom surface of the first light guide plate 110a may have a first pattern "P1" and the top surface of the second light guide plate 110b may have a second pattern "P2".

The shape of the first pattern "P1" and the shape of the second pattern "P2" may be the same as or different from each other. Even though the shape of the first pattern "P1" is the same as the shape of the second pattern "P2", the sizes of the patterns, the intervals between the patterns, or the densities of the patterns may be different from each other. Even though the shape of the first pattern "P1" is different from the shape of the second pattern "P2", the sizes of the patterns, the intervals between the patterns, or the densities of the patterns may be the same as each other. For example, the first pattern "P1" and the second pattern "P2" may be a plurality of dot-patterns which are easy to form. The first pattern "P1" and the second pattern "P2" may include not only the dot pattern but also a pattern having a shape different from the dot pattern.

The first pattern "P1" and the second pattern "P2" may be formed by inkjet printing or other various methods. The first pattern "P1" and the second pattern "P2" may be obtained when a plurality of lenses are formed on the first light guide plate 110a and the second light guide plate 110b or when the one sides themselves of the first light guide plate 110a and the second light guide plate 110b have a plurality of lens shape. Here, the lens has a size of a micro unit. The lens may be formed on the entire one sides of the first light guide plate 110a and the second light guide plate 110b or may be formed only in an actual light emitting area of the one sides of the first light guide plate 110a and the second light guide plate 110b.

As described above, the first light guide plate 110a and the second light guide plate 110b have a predetermined patterns, thereby controlling the distribution characteristic of light emitted upward and downward or controlling the amount of the light emitted upward and downward.

The second light guide plate 110b may have the protrusion 113b shown in FIG. 5. The first light guide plate 110a may also have the protrusion 113b.

The second light guide plate 110b may have the projection 111b. The projection 111b may project outwardly from the central portion of the bottom surface of the second light guide plate 110b. Similarly to the second light guide plate 110b, the projection 111b may have a plate shape. Therefore, the projection 111b may include a top surface, a bottom surface and four sides. Here, the top surface of the projection 111b may be connected to the bottom surface of the second light guide plate 110b.

Referring to FIG. 5, one side of two mutually facing sides of the projection 111b may contact with the extension part 152b' of the lower case 150b' of the second case 150B. The other side may contact with the extension part 152a' of the lower case 150a' of the first case 150A. The thickness of the projection 111b may be the same as or less than the thickness of the extension part 152b' of the lower case 150b' of the second case 150B.

Referring to FIGS. 1 to 3, the first optical plate 170a is disposed between the first light source 130a and the first and the second light guide plates 110a and 110b. The second optical plate 170b is disposed between the second light source 130b and the first and the second light guide plates 110a and 110b. The first optical plate 170a is disposed on the one sides of the first light guide plate 110a and the second light guide plate 110b. The second optical plate 170b is disposed on the other sides of the first light guide plate 110a and the second light guide plate 110b.

The first and the second optical plates 170a and 170b may be a prism sheet. If the first and the second optical plates 170a and 170b are the prism sheet, they are capable of removing hot spots of the first light source 130a and the second light source 130b.

The first and the second optical plates 170a and 170b change a portion of the wavelength of the light emitted from the first light source 130a and the second light source 130b, and then are able to vary the color and color temperature of the light. For this purpose, the first and the second optical plates 170a and 170b may include a transparent resin and a fluorescent substance included within the transparent resin. The fluorescent substances of the first and the second optical plates 170a and 170b may be the same as each other. However, the fluorescent substances of the first and the second optical plates 170a and 170b may be different from each other in order to create emotional lighting by changing the color of the light into another one. A description of the fluorescent substance will be replaced by the foregoing description.

A curing agent or an additive may be included within the transparent resin of the first and the second optical plates 170a and 170b. The curing agent may cure the transparent resin and the additive may uniformly disperse the fluorescent substance within the transparent resin. Further, a diffusing agent may be included within the transparent resin.

The diffusing agent increases the excitation ratio of the fluorescent substance by improving the refractive index of the light source.

Referring to FIGS. 1 to 3, the reflector 190 is made of flexible plastic and has a rectangular plate shape corresponding to those of the first light guide plate 110a and the second light guide plate 110b.

The reflector 190 is disposed between the first light guide plate 110a and the second light guide plate 110b. Specifically, the reflector 190 may be disposed between the bottom surface of the first light guide plate 110a and the top surface of the second light guide plate 110b.

A reflective material may be coated on entire both surfaces of the reflector 190 or may be coated only on actual light emitting areas of the first light guide plate 110a and the second light guide plate 110b.

The reflectance of the reflective materials coated on both surfaces of the reflector 190 may be different from each other. As a result, the amount of the light emitted from the first light guide plate 110a may be different from the amount of the light emitted from the second light guide plate 110b.

The reflector 190 may prevent the light emitted from the first light source 130a from entering the second light guide plate 110b, and may reflect the light emitted from the first light source 130a toward the top surface of the first light guide plate 110a. Also, the reflector 190 may prevent the light emitted from the second light source 130b from entering the first light guide plate 110a, and may reflect the light emitted from the second light source 130b toward the bottom surface of the second light guide plate 110b.

Though not shown in the drawings, the lighting module according to the embodiment may further include a diffusion plate.

The diffusion plate diffuses the light emitted from the first light guide plate 110a and the second light guide plate 110b. Through the use of the diffusion plate, hot spot of the light can be removed. The diffusion plate may be disposed on at least any one or both of the top surface of the first light guide plate 110a and the bottom surface of the second light guide plate 110b.

Figure 6:
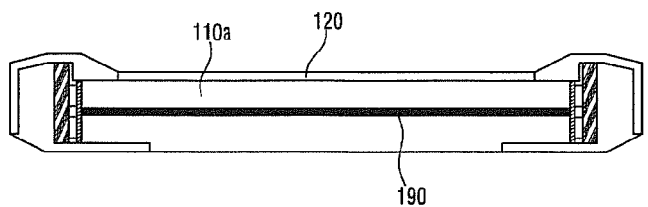
FIG. 6 is a cross sectional view showing a modified example of the lighting module shown in FIG. 3.

FIG. 6 is a cross sectional view showing a modified example of the lighting module shown in FIG. 3.

The lighting module shown in FIG. 6 is obtained by adding a cover 120 to the lighting module shown in FIG. 3. Since the components other than the cover 120 of the lighting module shown in FIG. 6 are the same as those of the lighting module shown in FIG. 3, descriptions of the components other than the cover 120 will be omitted.

Referring to FIG. 6, the cover 120 may be disposed on the top surface of the first light guide plate 110a. However, the cover 120 may be also disposed on the bottom surface of the second light guide plate 110b, without being limited to this. Accordingly, the cover 120 may be disposed on any one of the first light guide plate 110a and the second light guide plate 110b.

The cover 120 may be attached and fixed to the top surface of the first light guide plate 110a. Otherwise, both sides of the cover 120 may be fixed to the first case 150A and the second case 150B.

The cover 120 may block the light emitted from the top surface of the first light guide plate 110a in such a manner that all or a part of the light is not emitted outwardly. For this, the cover 120 may be made of a translucent or opaque material. The cover 120 may have a pattern having a shape allowing the light to pass through a portion of the cover 120 and not to pass through another portion of the cover 120.

When the cover 120 blocks a part of the light emitted from the top surface of the first light guide plate 110a and transmits the other part of the light, the amount of the light emitted in the up and down directions of the light module according to the embodiment can be controlled through the cover 120.

Meanwhile, when the cover 120 blocks all of the light emitted from the top surface of the first light guide plate 110a, a user may use a lighting module which emits the light only in the down direction thereof not in the up direction thereof.

In the lighting module shown in FIG. 6, if the reflector 190 is removed, the cover 120 may function to reflect the light. That is, a side of the cover 120, which faces the first light guide plate 110a, may be a mirror surface or a reflective surface coated with a reflective material. In this case, through the cover 120, the light emitted in the up direction of the lighting module is removed. However, the amount of the light emitted in the down direction of the lighting module may be increased.

The following Table 1 shows specification of the lighting module according to the embodiment shown in FIG. 1.

TABLE 1

| Product | Item | | Value | |
|---|---|---|---|---|
| Strip Spec. (13S * 5P) | Voltage (V) | | 39 | |
| | Current (mA) | | 350 | |
| | Power (W) | | 13.65 | |
| Module Spec. | Total Lumen output (lm) | Up Lumen Output | 2,500 | 500 |
| | | Down Lumen Output | | 2,000 |
| | Module Power (W) | | 27.3 | |
| | Efficacy (lm/W) | | 90 | |
| | CCT (K) | | 4,000 | |
| | CRI | | 80 | |
| Fixture Spec. | Lumen Output (lm) | | 10,000 (Up: 2,000, Down: 8,000) | |
| | DC Power Consumption (W) | | 110 | |

Referring to Table 1, in the lighting module shown in FIG. 1, an up Lumen output is less than a down Lumen output. However, contrarily, the up Lumen output may be greater than the down Lumen output.

Meanwhile, width W (mm)×height H (mm)×length L (mm) of the lighting module shown in FIG. 1 may be one of 80*12*560 and 45*12*560.

Although embodiments of the present invention were described above, these are just examples and do not limit the present invention. Further, the present invention may be changed and modified in various ways, without departing from the essential features of the present invention, by those skilled in the art. The present teaching can be readily applied to other types of apparatuses. The description of the foregoing embodiments is intended to be illustrative, and not to limit the scope of the claims. Many alternatives, modifications, and variations will be apparent to those skilled in the art.

The invention claimed is:

1. A lighting module comprising:
   a first light guide plate which includes a top surface and a bottom surface, each of which emits light, and a light incident side;
   a second light guide plate which is provided below the first light guide plate and includes a top surface and a bottom surface, each of which emits light, and a light incident side;

a reflector provided between the first light guide plate and the second light guide plate;
a light source which includes a first plurality of light emitting devices provided on a first side of the first light guide plate, and a second plurality of light emitting devices provided on a first side of the second light guide plate; and
a case in which the first sides of the first and the second light guide plates are disposed and in which the light source is disposed, wherein the case includes:
a first case on which the first sides of the first and the second light guide plates are disposed; and
a second case on which second sides opposite to that of the first sides of the first and the second light guide plates are disposed, wherein the second light guide plate includes cut out portions on the bottom surface along the first and second sides, wherein each cut out portion includes a protrusion, wherein each case includes a recess corresponding to each protrusion, wherein the bottom surface of the second light guide plate is on the same plant as a bottom surface of the first and second cases, wherein a distance on the top surface of the first light guide plate between the first case and the second case is different from a distance on the bottom surface of the second light guide plate between the first case and the second case, wherein a reflective material is disposed on both a top surface and a bottom surface of the reflector, wherein reflectances of the reflective material coated on the top surface and the bottom surface of the reflector are different from each other, and wherein a lumen output of the top surface of the first light guide plate is different from a lumen output of the surface of the second light guide plate.

2. The lighting module of claim 1, wherein the light source comprises a substrate on which the first plurality of light emitting devices and the second plurality of light emitting devices are disposed.

3. The lighting module of claim 2, wherein the first plurality of light emitting devices are disposed adjacent to each other on the substrate, and wherein the second plurality of light emitting devices are disposed adjacent to each other on the substrate.

4. The lighting module of claim 1, comprising an optical plate which is disposed between the side of the first light guide plate and the first plurality of light emitting devices and comprises a fluorescent substance.

5. The lighting module of claim 4, wherein the optical plate is a prism sheet.

6. The lighting module of claim 1, wherein the case comprises an upper case and a lower case, wherein the upper case and the lower case each comprise a base and an extension part, and wherein a length of the extension part of the upper case is different from a length of the extension part of the lower case, wherein each of the base of the lower case and the base of the upper case has an opening, wherein the lighting module farther comprises a driving driver disposed in the openings of the lower case and the upper case, and wherein the driving driver is electrically connected to the light source.

7. The lighting module of claim 1, wherein at least one of the top surface of the first light guide plate and the bottom surface of the second light guide plate comprises a protrusion, and wherein the case has a receiving recess which is coupled to the protrusion.

8. The lighting module of claim 1, further comprising a cover disposed on any one of the top surface of the first light guide plate and the bottom surface of the second light guide plate.

9. The lighting module of claim 8, wherein the cover blocks all or a portion of the light emitted from the top surface of the first light guide plate or the bottom surface of the second light guide plate.

10. The lighting module of claim 8, wherein the cover is attached to the top surface of the first light guide plate or the bottom surface of the second light guide plate.

11. The lighting module of claim 1, wherein the bottom surface of the first light guide plate comprises a first pattern, and wherein the top surface of the second light guide plate comprises a second pattern.

12. The lighting module of claim 11, wherein a density of the first pattern is different from a density of the second pattern.

13. The lighting module of claim 11, wherein an interval between the first pattern is different from an interval between the second pattern.

14. The lighting module of claim 11, wherein the first pattern and the second pattern comprise a plurality of lens shapes.

15. A lighting module comprising:
a light guide plate which includes a top surface and a bottom surface, each of which emits light, and a light incident side, wherein the bottom surface includes cut out portions formed along first and second sides of the light guise plate;
a light source which includes a plurality light emitting devices provided on the side of the light guide plate and a substrate on which the plurality of light emitting devices are provided; and
a case in which the light source is disposed and which covers the side of the light guide plate, wherein at least one of the cut out portions of the bottom surface of the light guide plate includes a protrusion,
wherein the case includes an upper case and a lower case, wherein the upper case and the lower case each includes a base and an extension part, wherein the extension part has a receiving recess which is coupled to the protrusion, wherein the base of the lower case is disposed on an inner surface of the base of the upper case, wherein the light source is provided on the base of the lower case, wherein a lumen output of the top surface of the light guide plate is different from a lumen output of the bottom surface of the light guide plate in that a length of the extension art of the upper case is different from a length of the extension part of the lower case, and wherein bottom surface of the light guide plate is on the same plane as a bottom surface of each extension part.

16. A lighting module comprising:
a light guide plate which includes a first side, a second side, a top surface and a bottom surface, wherein the bottom surface includes cut out portions formed along the first and second sides of the light guide plate;
a first light source which includes a first plurality of light emitting devices provided on the first side of the light guide plate and a first substrate on which the first plurality of light emitting devices are provided;
a second light source which includes a second plurality of light emitting devices provided on the second side of the light guide plate and a second substrate on which the second plurality of light emitting devices are provided;

a first case in which the first light source is disposed and which is coupled to the first side of the light guide plate; and a second case in which the second light source is disposed and which is coupled to the second side of the light guide plate, wherein a light emitting area of the top surface of the light guide plate is different from a light emitting area of the bottom surface of the light guide plate, wherein the first and second cases each include an upper case and a lower case, wherein each upper case and each lower case each include a base and an extension part, wherein a length of the extension part of each upper case is different from a length of each extension part of the lower case, wherein the extension part of each lower case includes a recess, wherein each cut out portion includes a protrusion corresponding to each recess, wherein the bottom surface of the light guide plate is on the same plane as a bottom surface of each lower case, wherein each of the base of the lower case and the base of the upper case has an opening, wherein the lighting module further includes a driving driver disposed in the openings of the lower case and the upper case, wherein the driving driver is electrically connected to the first light source, wherein a lumen output of the top surface of the light guide plate is different from a lumen output of the bottom surface of the light guide plate, and wherein a ratio of the lumen output of the top surface of the light guide plate to the lumen output of the bottom surface of the light guide plate is 2:8.

17. The lighting module of claim 16, Wherein at least one of the top and bottom surfaces of the light guide plate comprises a protrusion disposed therein, and wherein the first and the second cases have a receiving recess which is coupled to the protrusion.

18. The lighting module of claim 16, further comprising a cover disposed on any one of the top surface and the bottom surface of the light guide plate.

19. The lighting module of claim 15, wherein a coupling force between the case and the light guide plate is enhanced by coupling between the receiving recess and the protrusion.

* * * * *